3,781,234
FLEXIBLE POLYAMIDE HOT MELT ADHESIVE MADE FROM ETHYLENE DIAMINE AND AN ACID COMPONENT CONTAINING A POLYMERIC FATTY ACID AND HEPTADECANE DICARBOXYLIC ACID
Manfred Drawert, Werne, and Eugen Griebsch, Unna, Germany, assignors to Schering AG., Bergkamen, Germany
No Drawing. Filed June 20, 1972, Ser. No. 264,545
Claims priority, application Germany, June 26, 1971,
P 21 31 931.3
Int. Cl. C08g *20/00*
U.S. Cl. 260—18 N          3 Claims

ABSTRACT OF THE DISCLOSURE

Flexible polyamides, suitable for use as hot melt adhesives and as coating materials, prepared by condensing ethylene diamine with an acid component comprising 1,8- and/or 1,9-heptadecane dicarboxylic acid, a dimerized fatty acid, and, optionally, a further codicarboxylic acid having 7 to 20 carbon atoms.

---

The present invention relates to flexible polyamides adaptable to use as hot melt adhesives and as coating materials, and to a method for making the same.

More in particular, the polyamides of the invention are formed between ethylene diamine and an acid component comprising 1,8- or 1,9-heptadecane dicarboxylic acid (or a mixture thereof), a dimerized fatty acid, and, optionally, one or more further aliphatic, aromatic, araliphatic, or cycloaliphatic dicarboxylic acids having 7–20 carbon atoms.

Polyamides formed between a dimerized fatty acid and ethylene diamine are already known in the art. Products of this kind are brittle and, at viscosities up to 100 poises at 200° C., show practically no extension in tensile tests. It is for this reason that their use as hot melt adhesives is only limited and the materials cannot be used for coating purposes.

By co-condensation with other straight-chain dicarboxylic acids, the brittleness is increased even more. To be sure, the flexibility of the materials can be considerably increased by the introduction of co-diamines, but only with a loss of cohesion.

Processes for the preparation of polyamides from 1,8- or 1,9-heptadecane dicarboxylic acids and polyamines are known, for example from German patent publications 1,050,053 and 1,144,919. In the general description of German patent publication 1,144,919, ethylene diamine is mentioned as a useful amine for the preparation of transparent polyamides which form stable solutions in organic solvents, but there is no description of appropriate polyamides. Such polyamides comprising ethylene diamine would be unsuitable as hot melt adhesives since they are of a brittleness comparable to the corresponding polyamides comprising dimerized fatty acids.

These disadvantages of the prior art are overcome by the novel polyamides of the present invention which are distinguished by a particularly good flexibility combined with a high adhesion, even at low melt viscosities.

Although polyamides comprising dimerized fatty acids and ethylene diamine, on the one hand, and polyamides comprising heptadecane dicarboxylic acid and ethylene diamine, on the other hand, show practically no extension, a polyamide resin prepared from a mixture of the two acids and ethylene diamine shows an extension up to about 550 percent, measured on test rods.

This result is all the more surprising since the mixture of heptadecane dicarboxylic acid and dimerized fatty acid used in the present invention has heretofore not produced flexible polyamides with other diamines. Thus, if a heptadecane dicarboxylic acid dimeric fatty acid mixture is condensed with 3-aminomethyl - 3,5,5 - trimethylcyclohexylamine or with 4,4'-diamino-dicyclohexylmethane, that is with diamines which produce brittle polyamide resins when condensed with either heptadecane dicarboxylic acid or with the dimeric fatty acid, brittle products also result.

Whereas the softening point of a co-condensate according to the present invention is practically unchanged in comparison with that of a polyamide comprising dimerized fatty acid, the cohesion of the co-condensate is considerably improved, as is its flexibility also.

By co-condensation with further dicarboxylic acids having 7–20 carbon atoms, including straight-chain aliphatic acids such as pimelic, suberic, azelaic, sebacic, or decane dicarboxylic acid, or aromatic dicarboxylic acids such as terephthalic acid, araliphatic dicarboxylic acids such as phenylene diacetic acid, or cycloaliphatic dicarboxylic acids such as 1,4-cyclohexane dicarboxylic acid, the melting points of the polyamides of the invention can be raised above 200° C. Products with elevated softening points are particularly useful as hot melt adhesives because the improved resistance to heat of the adhered joints is particularly advantageous.

These high-melting polyamide resins according to the invention are distinguished from comparable polyamide resins comprising dimerized fatty acid and a co-dicarboxylic acid by their higher tensile strength, elongation at tear, and flexibility.

The polymeric fatty acid suitable for use in the method of the present invention can be obtained by the polymerization of unsaturated fatty acids having 12–20 carbon atoms by techniques well known in the art. The polymerization is generally thermal, preferably with the use of a catalytically active clay, whereby a mixture is obtained which predominantly comprises dimeric fatty acid and smaller portions of trimeric and monomeric fatty acid. The content of dimeric fatty acid in a polymerized fatty acid is generally about 60 percent. By distillation, a purified distilled fatty acid having a content of up to 100 percent of dimeric fatty acid can be obtained.

The polymerized fatty acid employed in the polyamides according to the present invention may have a content of dimeric acid between 50 percent and 100 percent. The remainder comprises higher polymeric fatty acids, largely trimeric, and monomeric fatty acid. The dimerized fatty acid employed can also be hydrogenated.

The 1,8- or 1,9-heptadecane dicarboxylic acid is also obtained according to a known process (for example see German Pat. 1,006,849) by the carboxylation of oleic acid. As a rule, a mixture of the 1,8- and 1,9-isomers is obtained. For optimum flexibility of the polyamides of the present invention, 10–80 percent by weight preferably 30–70 percent by weight, of heptadecane dicarboxylic acid is employed in admixture with a dimerized fatty acid. The amount of co-dicarboxylic acid which is or can be added to obtain the flexible polyamides of the present invention depends on:

(a) The mixing ratio of heptadecane dicarboxylic acid to dimerized fatty acid;
(b) The kind of co-dicarboxylic acid employed (i.e. whether it is aliphatic, aromatic, araliphatic, or cycloaliphatic); and
(c) The number of carbon atoms per molecule of co-dicarboxylic acid.

Thus, when a co-dicarboxylic acid is present, the amount imparting effective and advantageous properties may be between about 1 and about 80 percent by weight, calculated on the total amount of carboxylic acids present. For example, the amount of aliphatic codicarboxylic acid used is suitably between about 10 and about 70 percent by weight, while the amount of aromatic acid may be between about 1 and about 15 percent by weight. Suitable amounts of araliphatic or cycloaliphatic co-dicarboxylic acids as a rule lie between the limits for the aliphatic and the aromatic co-dicarboxylic acids.

The dicarboxylic acids employed, namely heptadecane dicarboxylic acid, the dimerized fatty acids, as well as the co-dicarboxylic acids, can optionally be used in the form of their reactive derivatives, for example their esters or amides.

of heptadecane dicarboxylic acid and dimerized tall oil fatty acid, was employed.

The reaction temperatures for Comparison Examples 2 and 3 were 230° C.

The results of all examples and comparison examples are summarized in following Table I. In the table, the viscosity is the melt viscosity, in poises, at 200° C. The ring-and-ball-softening point was determined according to DIN 1995. The tensile strength was determined according to DIN 53455. The elongation is the elongation at tear according to DIN 53455. HDA=heptadecane dicarboxylic acid; DFA=dimerized tall oil fatty acid; CDA =co-dicarboxylic acid; EDA=ethylene diamine.

TABLE I

| | HDA (g.) | DFA Grams | DFA Percent | CDA (g.) | EDA (g.) | Amine No. | Acid No. | Viscosity (poises) | Softening point (° C.) | Tensile strength (kg.f./cm.²) | Extension (percent) |
|---|---|---|---|---|---|---|---|---|---|---|---|
| Example: | | | | | | | | | | | |
| 1 | 280.0 | 120.0 | 92 | | 65.8 | 4.9 | 6.0 | 64 | 115 | 173 | 410 |
| 2 | 140.0 | 60.0 | 75 | | 33.1 | 6.0 | 5.4 | 116 | 115 | 154 | 415 |
| 3 | 120.0 | 280.0 | 92 | | 52.3 | 4.3 | 4.9 | 75 | 106 | 106 | 545 |
| 4 | 200.0 | 200.0 | 75 | ¹ 24.0 | 66.7 | 4.2 | 4.9 | 47 | 130 | 112.5 | 387 |
| 5 | 200.0 | 200.0 | 75 | ² 9.36 | 62.0 | 4.1 | 6.6 | 36 | 114 | 91.7 | 300 |
| Comparison Example: | | | | | | | | | | | |
| 1 | 400.0 | | | | 76.2 | 5.4 | 7.0 | 130 | 113 | 117 | 7 |
| 2 | | 400.0 | 75 | | 42.3 | 3.6 | 4.1 | 35 | 116 | 50 | 5 |
| 3 | | 400.0 | 92 | | 40.6 | 1.2 | 8.0 | 50 | 115 | 110 | 10 |

¹ Azelaic acid.  ² Dimethylterephthalate.

As the diamine, ethylene diamine is employed, a small portion of which can be replaced by 1,2-diaminopropane. To prepare the polyamides, approximately stoichiometric amounts of ethylene diamine and of the acid component comprising heptadecane dicarboxylic acid, dimerized fatty acid, and optional co-dicarboxylic acid are condensed at a temperature from 180° C. to 280° C. Because of the difference in reactivity between the two carboxylic groups of heptadecane dicarboxylic acid, it is recommended that an amidation catalyst be employed in the condensation process. For example a small amount of triphenyl phosphite, about 0.1–2 percent, preferbaly 0.25–1 percent, by weight of the heptadecane dicarboxylic acid and fatty acid combined, can be used.

A better understanding of the present invention and of its many advantages will be had by referring to the following specific examples given by way of illustration.

EXAMPLE 1

280 g. of heptadecane dicarboxylic acid and 120 g. of dimerized tall oil fatty acid having a dimeric fatty acid content of 92 percent by weight were mixed in a three-necked flask equipped with a stirrer, thermometer, and descending condenser. The apparatus was evacuated and refilled with nitrogen as a protective atomsphere. 65.8 g. of ethylene diamine were added with stirring. The batch was heated to 260° C. over a period of two hours. Then, 1.0 g. of triphenyl phosphite was added and the batch was held for a further two hours at a temperature of 260° C. Finally, the batch was completely condensed over a further period of four hours at 260° C. under a vacuum of about 15 mm. Hg. The finished resin was cooled to 200° C. and poured onto paper treated with a parting agent. The resin had the following characteristics:

Amine number _____ 4.9.
Acid number _____ 6.0.
Ring-and-ball-softening point _____ 115° C.
Melt viscosity _____ 64 poises at 200° C.
Tensile strength _____ 173 kgf./cm.².
Elongation _____ 410%.

EXAMPLES 2–5 AND COMPARISON EXAMPLES 1–3

In the following examples, the resins were prepared in a way analogous to that of Example 1.

For Examples 2–5 and Comparison Example 1, 0.25 percent of triphenyl phosphite, by weight of the total

What is claimed is:

1. A polyamide, adaptable to use as a hot melt adhesive, which is the reaction product of approximately stoichiometric amounts of:
   (A) ethylene diamine; and
   (B) an acid component comprising up to about 80 percent by weight of
      (1) a dicarboxylic acid having from 7 to 20 carbon atoms, the balance being
      (2)(a) about 10 to about 80 percent by weight of 1,8- or 1,9-heptadecane dicarboxylic acid, or a mixture thereof, the balance being
      (2)(b) a polymerized fatty acid having a dimeric fatty acid content between 50 and 100 percent; said reaction product being formed at a temperature from 180° C. to 280° C. in the presence of about 0.1 to 2 percent, by weight of said heptadecane dicarboxylic acid and dimerized fatty acid combined, of triphenyl phosphite.

2. A polyamide as in claim 1 wherein said acid component comprises from about 1 to about 80 percent by weight of said dicarboxylic acid (B)(1) having from 7 to 20 carbon atoms.

3. A polyamide as in claim 1 wherein the balance (B)(2) of said acid component comprises from about 30 to about 70 percent by weight of heptadecane dicarboxylic acid (B)(2)(a).

References Cited

UNITED STATES PATENTS 3,357,935  12/1967  Fulmer et al. _____ 260—18
3,398,164  8/1968   Rogier _____ 260—18

FOREIGN PATENTS 1,006,849  9/1957  Germany.
1,050,053  8/1959  Germany.
1,144,919  9/1963  Germany.
1,000,216  8/1965  Great Britain _____ 260—18
991,514    5/1965  Great Britain _____ 260—18

DONALD E. CZAJA, Primary Examiner

E. C. RZUCIDLO, Assistant Examiner

U.S. Cl. X.R.

161—190; 260—78 R, 404.5

UNITED STATES PATENT OFFICE
CERTIFICATE OF CORRECTION

Patent No. 3,781,234    Dated December 25, 1973

Inventor(s) Manfred Drawert et al.

It is certified that error appears in the above-identified patent and that said Letters Patent are hereby corrected as shown below:

<u>In the heading</u>, after "Schering AG.," insert

--Berlin and--.

Signed and sealed this 30th day of July 1974.

(SEAL)
Attest:

McCOY M. GIBSON, JR.
Attesting Officer

C. MARSHALL DANN
Commissioner of Patents